(12) United States Patent
Dalrymple

(10) Patent No.: US 7,421,118 B2
(45) Date of Patent: Sep. 2, 2008

(54) SYSTEM AND METHOD FOR ATTENUATING COLOR-CAST CORRECTION IN IMAGE HIGHLIGHT AREAS

(75) Inventor: John Charles Dalrymple, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1333 days.

(21) Appl. No.: 10/390,323

(22) Filed: Mar. 17, 2003

(65) Prior Publication Data
US 2004/0183923 A1    Sep. 23, 2004

(51) Int. Cl.
*G06K 9/00* (2006.01)
(52) U.S. Cl. ...................... 382/167; 382/162
(58) Field of Classification Search ............... 382/167, 382/162; 358/1.15, 1.18, 406; 348/255, 348/227.1, E9.052
See application file for complete search history.

(56) References Cited

U.S. PATENT DOCUMENTS

| | | | |
|---|---|---|---|
| 5,194,943 A * | 3/1993 | Tomita et al. | 348/255 |
| 5,530,474 A | 6/1996 | Takei | 348/224 |
| 6,108,037 A | 8/2000 | Takei | 348/224 |
| 6,195,125 B1 | 2/2001 | Udagawa et al. | 348/222 |
| 7,139,087 B2 * | 11/2006 | Hayashi | 358/1.15 |

FOREIGN PATENT DOCUMENTS

JP    2001-076550    9/2002

* cited by examiner

*Primary Examiner*—Anh Hong Do
(74) *Attorney, Agent, or Firm*—Law Office of Gerald Maliszewski; Gerald Maliszewski

(57) ABSTRACT

A method is provided for attenuating image color-cast corrections. The method comprises: selecting a highlight color; accepting a digital image of colored pixels; calculating the difference between the color of at least one pixel and the highlight color; determining an illuminant correction for the digital image; and, attenuating the image illuminant correction for at least one pixel in response to the calculated color differences. In some aspects of the method, a highlight color with a plurality of color components is selected, for example, white. Then, calculating the difference between the color of at least one pixel and the highlight color includes calculating the difference of at least one color component of the pixel from the corresponding component in the highlight color.

23 Claims, 4 Drawing Sheets

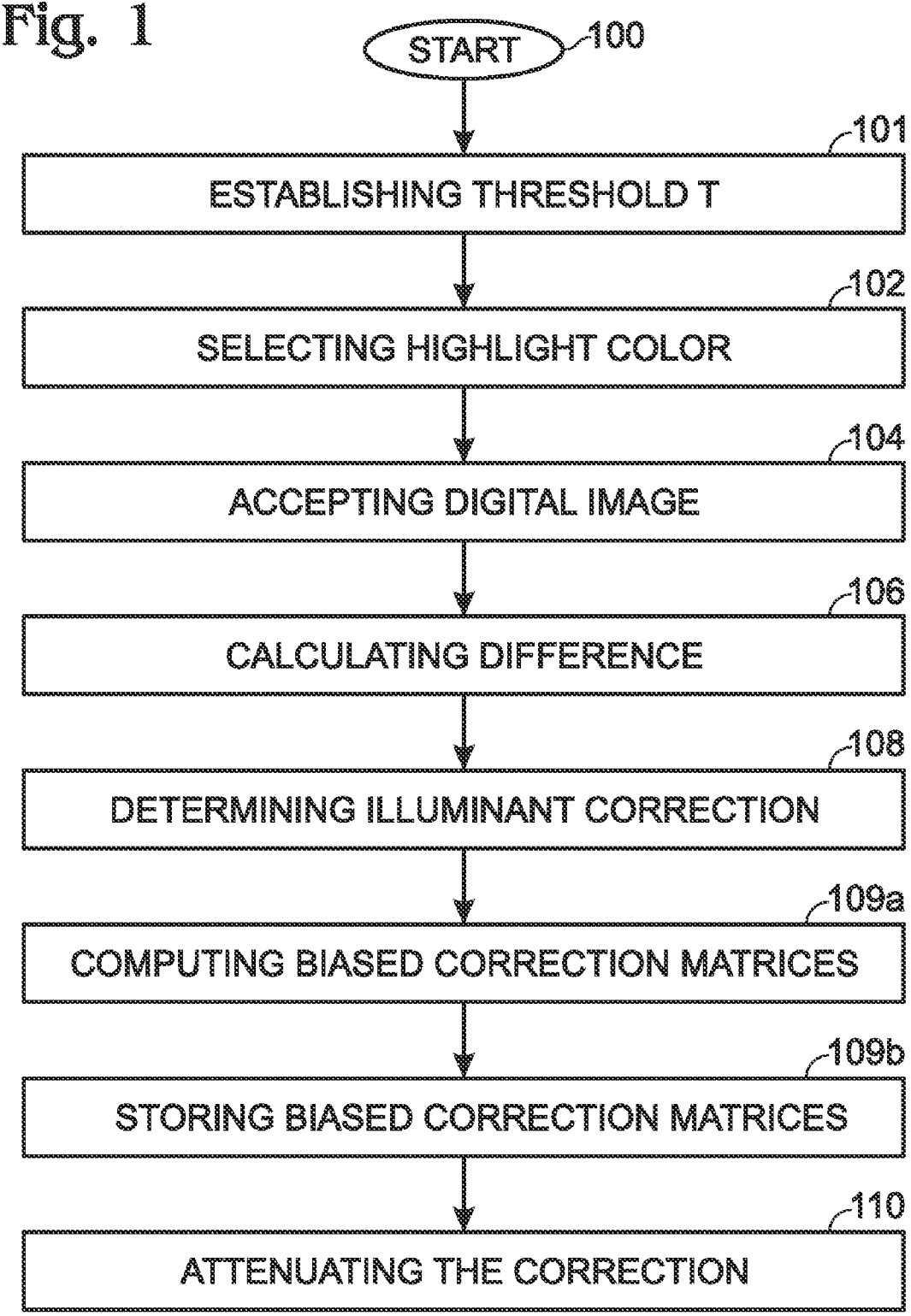

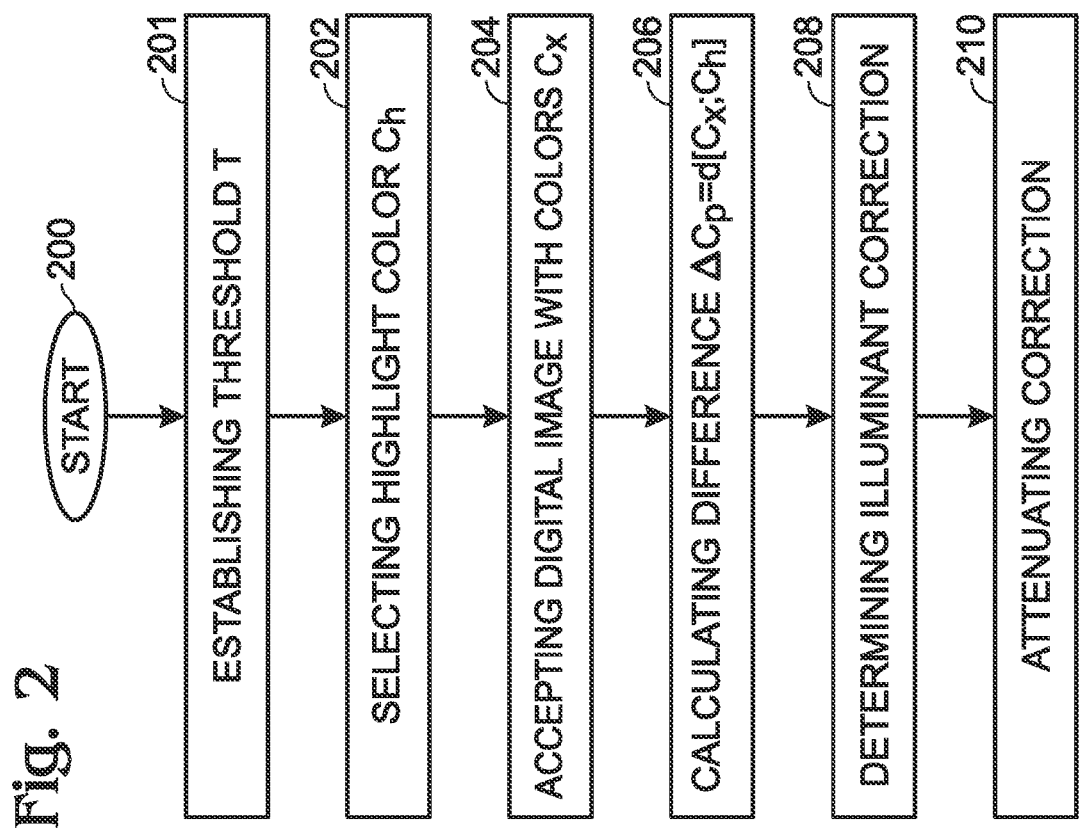

SYSTEM AND METHOD FOR ATTENUATING COLOR-CAST CORRECTION IN IMAGE HIGHLIGHT AREAS

BACKGROUND OF THE INVENTION

1. Field of the Invention

This invention generally relates to digital image processing and, more particularly, to a method for attenuating color-cast corrections in image highlight regions.

2. Description of the Related Art

Many digital images, for example digital photographs, can be dramatically improved if the image is color corrected before presentation. For example, a (red/green/blue) RGB color-imaging system can be "color balanced" or "white balanced" (i.e., calibrated/aligned/set up) such that, for some particular illumination spectrum (illuminant 1), a nonselective neutral object (i.e., one having a constant spectral reflectance response vs. wavelength) will produce equal R, G, B components in the image. If some other light spectrum (illuminant 2) shines on the scene and the same scene is photographed using the color balance setup for illuminant 1, then the RGB's in the image under illuminant 2 will not be equal. If they are far enough off, the image will not appear neutral, i.e., it will have a color cast. This is analogous to using a daylight film to photograph an indoor scene under tungsten illumination, where the picture comes out with a yellow cast. This problem can be fixed by putting just the right blue filter over the lens. Then, neutrals (objects with flat reflectance spectra) in the indoor scene will come out neutral in the indoor picture, just like the same objects would do in the outdoor picture taken without the filter. The color cast correction transform in the digital imaging system is similar to this blue filter in the analog imaging system. An illuminant estimation process attempts to determine a scene illuminant from an analysis of the image. Color cast correction creates one or more correction transforms, analogous to one or more filters of "just the right color", based on this estimate. In digital imaging, the correction is applied after (not during) image capture, to adjust the RGB's of the image and to rebalance it so nonselective neutrals once again come out with equal R, G, B components.

A RGB digital image can be color-cast corrected, white-balanced, or gray-balanced via a single "global" transformation, using a von Kries type matrix transform for example. This transform, and many other similar correction methods, are dependent upon an illuminant estimation procedure that is applied to the image data. In this approach, all the colors in the image are adjusted in an identical manner based upon the assumption that of the image regions have been lit by a common illuminant.

For example, an image taken under incandescent light may have a strong yellow cast when the digital camera's manual color controls are incorrectly set, or when the camera's automatic white balance algorithm fails. Correcting such an image using a single transform, derived from the overall image statistics, shifts all the pixels (except pure black ones) in the direction of blue. In the midtone and shadow areas, the visual effect of the correction is good—the output pixels for neutral objects are more neutral (i.e., their RGB components are more nearly equal), as desired. But in specular highlights and/or overexposed areas that are pure white in the original image (R=G=B=1, where 1 is the maximum value), an image corrected in this manner has a pronounced color-cast whose hue is complementary to that of the estimated illuminant. In the above example, the color white in the original image becomes pastel blue in the corrected image. This appears unnatural on a reflection print made on a nominally white substrate where some of the regions of the substrate, such as the regions adjacent the white borders, remain unmarked by the printing process. The human eye is sensitive to these errors in the correction process. Intuitively, "whites should still look white" after the image is corrected.

Further, pure white pixels in the original image are usually the result of the color component information being clipped during image capture, and there is no way to recover the real hue associated with these pixels at the time the image was taken.

It would be advantageous if highlight regions in an image were not treated identically to other colors, when a digital image is being color-cast corrected.

It would be advantageous if white pixels in an image were treated differently than other colors, when a digital image is being color-cast corrected.

It would be advantageous if the color-cast corrections that are applied to a corrected image could be attenuated, or not applied at all, for the white pixels in the original image.

SUMMARY OF THE INVENTION

The present invention avoids color-casts in highlight regions that occur as a side effect of the color-cast correction procedure, by attenuating the amount of correction applied to pixels that are white (for example) or close (in color space) to white. The amount of attenuation can taper to zero as the color of the input pixel becomes more distant from white.

Accordingly, a method is provided for attenuating image color-cast corrections. The method comprises: selecting a highlight color; accepting a digital image of colored pixels; calculating the difference between the color of at least one pixel and the highlight color; determining an illuminant correction for the digital image; and, attenuating the image illuminant correction for at least one pixel in response to the calculated color differences.

In some aspects of the method, a highlight color with a plurality of color components is selected. As mentioned above, white is typically a highlight color. Then, calculating the difference between the color of at least one pixel and the highlight color includes calculating the difference of at least one color component of the pixel from the corresponding component of the highlight color. Using white as an example, the difference may be calculated for red, green, and/or blue color components.

In other aspects, selecting a highlight color includes representing the highlight color as N color components corresponding to a point $C_h$ in an N-dimensional space, where N>1, as follows:

highlight color=$(C_{1h}, C_{2h}, \ldots C_{Nh})=C_h$.

Accepting a digital image of colored pixels includes accepting an image including a plurality of pixels, where each pixel x is represented as N color components corresponding to a point $C_x$ in an N-dimensional space, where N>1, as follows:

color at image pixel $x=(C_{1x}, C_{2x}, \ldots C_{Nx})=C_x$.

Then, calculating the difference between the color of at least one pixel and the highlight color includes representing the difference as a scalar difference $\Delta C_x$ between the points $C_x$ and $C_h$ in N-dimensional space as follows:

$$\Delta C_p = d[C_x, C_h]$$
$$= d[(C_{1x}, C_{2x}, \ldots C_{Nx}), (C_{1h}, C_{2h}, \ldots C_{Nh})]$$

where d is a distance metric such as an Lp metric, which includes the Euclidean metric where p=2, or the $L_\infty$ metric.

Additional details of the above-described method are provided below.

BRIEF DESCRIPTION OF THE DRAWINGS

FIG. 1 is a flowchart illustrating the present invention method for attenuating image color-cast corrections.

FIG. 2 is a flowchart illustrating a second aspect of the present invention method for attenuating image color-cast corrections.

FIG. 3 is a flowchart illustrating a third aspect of the present invention method for attenuating image color-cast corrections.

DETAILED DESCRIPTION OF THE PREFERRED EMBODIMENTS

Figure 4:
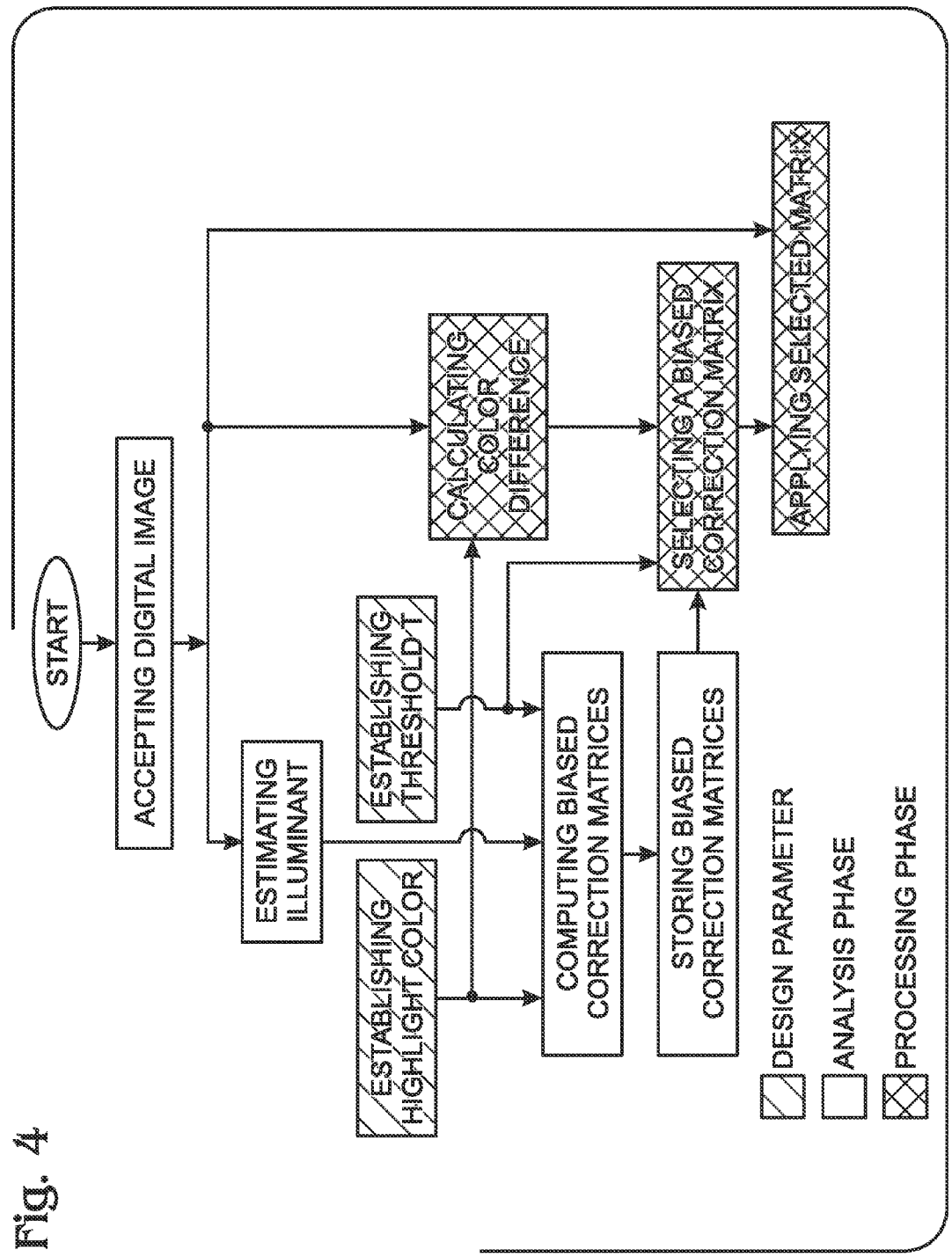
FIGS. 4 and 5 are related variations of the flowchart of FIG. 1, showing the dependencies among the computations.

Generally, the present invention processes each pixel of the input image as follows:
1. Compute a distance d from pixel color to white, assuming white to be the highlight color of interest. Any convenient metric can be used. For example, when using the $L_\infty$ metric, d=max(1−R, 1−G, 1−B)=1−min(R, G, B), or when using the $L_1$ metric, d=3−(R+G+B), where the RGB signals range from 0 to 1.
2. Compute the attenuation factor $A_x$ as a function of d. At d=0, $A_x$=1. $A_x$ tapers smoothly to 0 as the distance from white increases, becoming essentially 0 for all distances beyond some threshold. The shape of the $A_x$ curve can be empirically determined.
3. Blend between color correction matrix $\underline{C}$ and identity matrix $\underline{I}$: $\underline{M}=A_x\cdot\underline{I}+(1-A_x)\cdot\underline{C}$. As used herein, symbols that are both italicized and bolded represent vectors, underlined symbols represent matrices, and undifferentiated symbols represent scalar values.
4. Apply blended matrix $\underline{M}$ to input pixel color.

Given the color correction matrix $\underline{C}$ previously computed from the image statistics, a set of biased matrices $\underline{M}$(d) can be computed for a set of distance values d spanning the interval of d over which the $A_p$(d) function is varying. These matrices can be stored in a lookup table indexed by d. When color-cast correcting an image, the value of d is computed on-the-fly for each input pixel. To minimize processing time, the corresponding biased matrix $\underline{M}$ can be retrieved from the table and applied to the pixel value.

FIG. 1 is a flowchart illustrating the present invention method for attenuating image color-cast corrections. Although the method (and the methods of FIGS. 2 and 3) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 100.

Step 102 selects a highlight color. Step 104 accepts a digital image of colored pixels. Step 106 calculates the difference between the color of at least one pixel and the highlight color. Step 108 determines an illuminant correction for the digital image. Step 110 attenuates the image illuminant correction for at least one pixel in response to the calculated color differences.

In some aspects of the method, selecting a highlight color in Step 102 includes selecting a highlight color with a plurality of color components. Then, calculating the difference between the color of at least one pixel and the highlight color in Step 106 includes calculating the difference of at least one color component of the pixel from the corresponding component in the highlight color. For example, in an RGB imaging system the color white has three equal color components. The difference calculation can be applied to either all, or just some of the color components in the color white. However, it should be understood that the present invention color-cast attenuation process can be applied to other colors besides white. For example, in certain circumstances the color-cast attenuation process may be applied to image surfaces that are known, or calculated to be reflective, regardless of the color being reflected. Further, the color-cast can be attenuated for image colors that have a predetermined relationship with the known or calculated illuminant. In other aspects, more than more highlight color can be chosen, where the highlight colors may have at least some differing color components.

In some aspects, selecting a highlight color in Step 102 includes representing the highlight color as N color components corresponding to a point $C_h$ in an N-dimensional space, where N>1, as follows:

$$\text{highlight color}=(C_{1h}, C_{2h}, \ldots C_{Nh})=C_h.$$

Accepting a digital image of colored pixels in Step 104 includes accepting an image including a plurality of pixels, where each pixel x is represented as N color components corresponding to a point $C_x$ in an N-dimensional space, where N>1, as follows:

$$\text{color at image pixel } x=(C_{1x}, C_{2x}, \ldots C_{Nx})=C_x.$$

Then, calculating the difference between the color of at least one pixel and the highlight color in Step 106 includes representing the difference as a scalar difference $\Delta C_x$ between the points $C_x$ and $C_h$ in N-dimensional space as follows:

$$\Delta C_p = d[C_x, C_h]$$
$$= d[(C_{1x}, C_{2x}, \ldots C_{Nx}), (C_{1h}, C_{2h}, \ldots C_{Nh})]$$

where d is a distance metric. The distance metric (d) can a metric selected from the group including Euclidean, $L_p$, and $L_\infty$ metrics. In some aspects, where the $L_p$ distance metric is used, the p in the $L_p$ metric is dependent upon the color components of pixels in the image.

In other aspects, attenuating the image illuminant correction for at least one pixel in response to the calculated color differences in Step 110 includes representing an illuminant correction attenuation ($A_x$) at pixel x as a function (f) of the distance $\Delta C_x$, as follows:

$$A_x = f(\Delta C_x).$$

In some aspects, representing the illuminant correction attenuation ($A_x$) as a function (f) of the distance $\Delta C_x$ includes selecting the function in response to an image pixel color component.

In some aspects a further step, Step 101 establishes a threshold T. Then, representing the illuminant correction attenuation ($A_x$) as a function (f) of the distance $\Delta C_x$ in Step 110 includes selecting the function f=0 in response to the distance $\Delta C_x$ exceeding the value T.

In other aspects, representing the illuminant correction attenuation ($A_x$) as a function (f) of the distance $\Delta C_x$ includes:
  f being montonically non-increasing in the interval
    $0 \leq \Delta C_x \leq T$;

$f(0) = A_{max}$;

$f(T) = 0$; and, $A_{max} > 0$.

In some aspects, attenuating the image illuminant correction for at least one pixel in response to the calculated color differences in Step 110 includes biasing the correction in response to the value of $A_x$.

In one aspect, calculating a color difference in Step 106 includes determining a corrected color $C'_x$ by generating a global correction matrix $\underline{M_G}$ for all image pixels. Then, the method includes further steps. Step 109a computes a set of biased correction matrices $\underline{M_k}$ cross-referenced to values of $\Delta C_x$ in the range of:

$0 \leq \Delta C_x \leq T$.

Step 109b stores the set of biased correction matrices. Then, Step 110 includes computing a final corrected color $K_x$ by:
calculating $\Delta C_x$;
comparing $\Delta C_x$ to T;
if $\Delta C_x \leq T$, retrieving a biased correction matrix from the set of stored biased correction matrices; and,
applying the retrieved biased correction matrix to the pixel color $C_x$.

In some aspects, computing a final corrected color $K_x$ includes, if $\Delta C_x > T$, not attenuating the illuminant correction.

In different aspects of the method, determining an illuminant correction for the digital image in Step 108 includes determining a plurality of illuminant corrections. Then, attenuating the image illuminant correction for at least one pixel in Step 110 includes attenuating a plurality of illuminant corrections that are applied to the image.

Further, Step 108 may determine a first corrected color $C'_x$ for a pixel. Then, attenuating the image illuminant correction for at least one pixel in response to the calculated color differences in Step 110 includes biasing the correction to compute a final corrected color $K_x$ for a pixel as follows:

$K_x = [A_x C_x + (A_{max} - A_x) C'_x]/A_{max}$.

In other aspects, determining a first corrected color $C'_x$ for a pixel, for each illuminant correction, includes generating and applying a matrix transformation $\underline{M}$ as follows:

$C'_x = \underline{M} C_x$;

where $\underline{M}$ is a first correction matrix.

Then, biasing the attenuation in response to the value of $A_x$ (Step 110) includes computing a biased correction matrix $\underline{M_k}$ as a convex combination of an N×N identity matrix $\underline{I_n}$ and the first correction matrix $\underline{M}$, as follows:

$\underline{M_k} = [A_x \underline{I_n} + (A_{max} - A_x) \underline{M}]/A_{max}$; and, computing the final corrected color $K_x$ as follows:

$K_x = \underline{M_k} C_x$.

In another aspect of the method, representing the illuminant correction attenuation ($A_x$) as a function (f) of the distance $\Delta C_x$ (Step 110) includes selecting the function f=0 in response to the distance $\Delta C_x$ exceeding the value T.

FIG. 2 is a flowchart illustrating a second aspect of the present invention method for attenuating image color-cast corrections. The method starts at Step 200. Step 202 selects a highlight color with N color components corresponding to a point $C_h$ in an N-dimensional space, where N>1, as follows:

highlight color = $(C_{1h}, C_{2h}, \ldots C_{Nh}) = C_h$.

Step 204 accepts a digital image of N color components corresponding to a points $C_x$ in an N-dimensional space, where N>1, as follows:

color at image pixel $x = (C_{1x}, C_{2x}, \ldots C_{Nx}) = C_x$.

Step 206, for at least one color component, calculates differences between the image pixels and the highlight color, representing the difference as a scalar difference $\Delta C_x$ between the points $C_x$ and $C_h$ in N-dimensional space as follows:

$$\Delta C_x = d[C_x, C_h]$$
$$= d[(C_{1x}, C_{2x}, \ldots C_{Nx}), (C_{1h}, C_{2h}, \ldots C_{Nh})]$$

where d is a distance metric selected from the group of distance metrics including Euclidean, $L_p$, and $L_\infty$ metrics. Step 208 determines an illuminant correction for the digital image. Step 210 attenuates the image illuminant correction for at least one pixel in response to the calculated color differences.

In some aspects, attenuating the image illuminant correction for at least one pixel in response to the calculated color differences in Step 210 includes representing an illuminant correction attenuation ($A_x$) at pixel x as a function (f) of the distance $\Delta C_x$, as follows:

$A_x = f(\Delta C_x)$.

In other aspects, Step 201 establishes a threshold T. Then, representing the illuminant correction attenuation ($A_x$) as a function (f) of the distance $\Delta C_x$ (Step 210) includes selecting the function f=0 in response to the distance $\Delta C_x$ exceeding the value T.

FIG. 3 is a flowchart illustrating a third aspect of the present invention method for attenuating image color-cast corrections. The method starts at Step 300. Step 302 selects a plurality of highlight colors. Step 304 accepts a digital image of colored pixels. Step 306 calculates the difference between the color of at least one pixel and at least one highlight color. Step 308 determines an illuminant correction for the digital image. Step 310 attenuates the image illuminant correction for at least one pixel in response to the calculated color differences. In some aspects, selecting a plurality of highlight colors in Step 302 includes the selected highlight colors differing by at least one color component.

Figure 5:
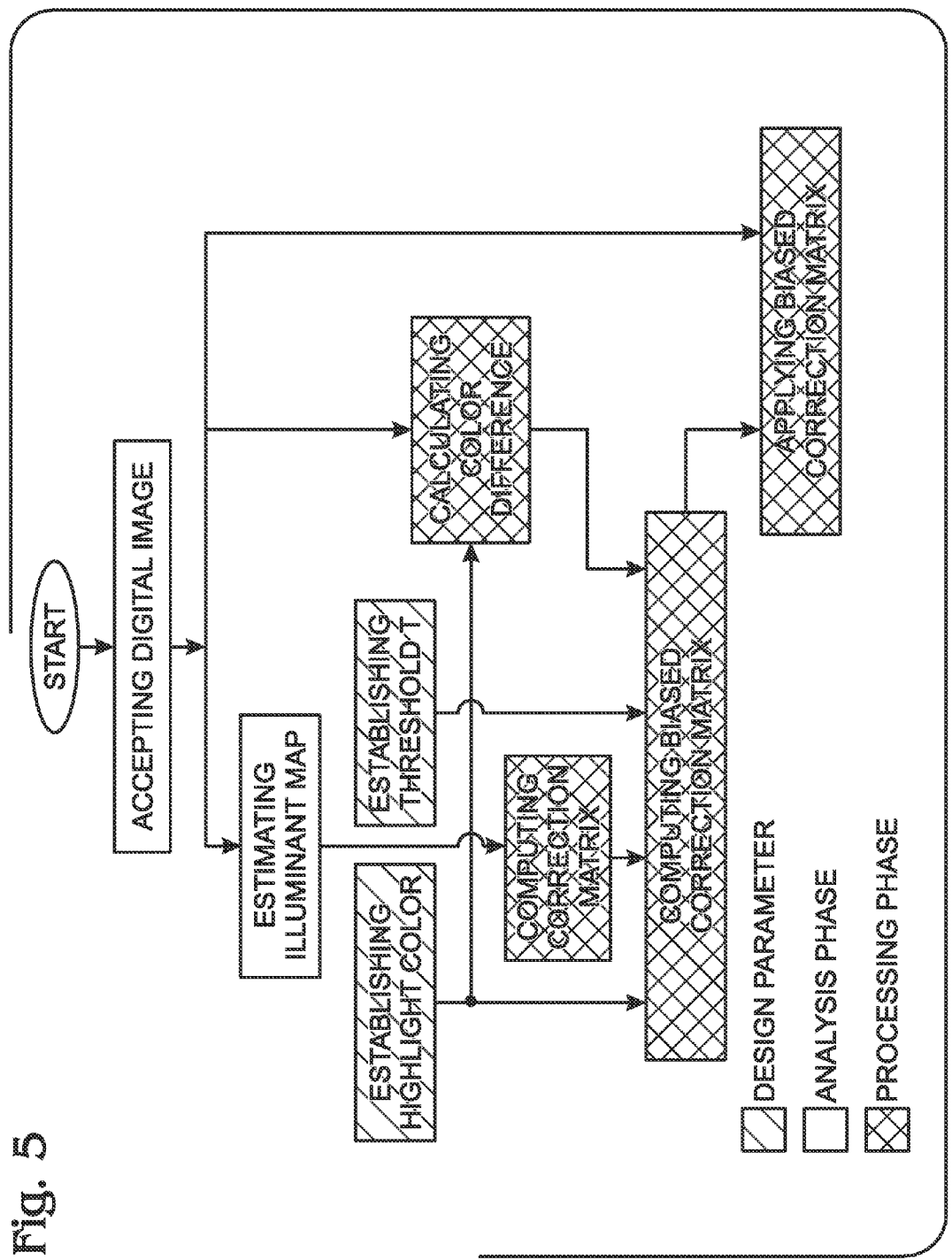

FIGS. 4 and 5 are related variations of the flowchart of FIG. 1, showing the dependencies among the computations. The cross-hatched boxes represent steps that can be performed in a design phase, the white box represents an analysis phase, and the dark boxes represent a processing phase. The steps of "establishing highlight color" and "establishing threshold T" may be considered a priori design decisions. However, these steps could also be image dependent. For example, if an image doesn't have any pixels near white, the present invention method may be skipped, to save processing time.

Generally, the method works as follows: "Estimating illuminant" first analyzes the image and generates an illuminant correction transform (such as a correction matrix). More-sophisticated illuminant estimation methods might segment the image into a (small) number of regions and calculate a different correction matrix for each region. The present invention method can be applied independently to each such region. Based on the highlight color (which is required) and threshold T (which could be optional), a number of biased (attenuated) correction matrices are computed and stored for a number of color difference values up to T. All this happens during the "analysis phase"—then the "processing phase"

occurs. During the processing phase, the image color difference at each pixel is used to select one of the stored matrices (valid for the current region, in the case of multiple regions/correction matrices). The selected matrix is applied to the pixel data. This is the "global correction" (or small number of region-specific corrections) case, and is represented in FIGS. 1 and 4.

In the limit, a sophisticated illuminant estimation algorithm might compute a different correction transform at each pixel. In that case, a set of biased correction matrices is not pre-computed during the analysis phase and selected, based on computed color differences, during the processing phase. Instead, the analysis phase consists of only computing the spatially-varying correction matrix, and more work is performed during the processing phase. The color difference is measured, the attenuation factor is calculated, the attenuation is applied to the matrix (i.e., the matrix is biased) on-the-fly, and the biased matrix is applied to the pixel value.

With respect to the use of threshold T, the RGB color components are often encoded in practice as 8 bits each (24 bits per pixel in all), where the numbers are scaled such that the binary value 11111111 (decimal 255) represents unity (i.e., the maximum possible amount of R, G, and/or B). The range of distances from white through which the method attenuates the color correction is relatively small, for example, 10% or less of the total range.

In this example, if the $L_1$ metric is used to compute d, d=(3*255)−(R+G+B)=765−R−G−B.

So over the set of all possible images, the d computed at each pixel might be any integer from 0 to 765. 10% of that range is 76.5. If the correction needs to be attenuated in the top 10% of the range, a threshold T=77 could be established. In this case, matrices having 77 differing degrees of attenuation, corresponding to d=0 through d=76 inclusive, would be computed and stored. There is not no need to calculate or store any attenuated matrices for d≧77. When this is done, the algorithm requires a step where it compares d against T, and applies the unmodified correction matrix to the pixel color when d≧T.

If memory size is not a problem, a threshold is not required, and the algorithm doesn't need a step of threshold comparison. In this case (referring to the above example) 766 matrices would be stored, where the matrices for d=0 through d=76 are the same as the ones in the preceding paragraph, and the ones for d=77 through d=765 are all the same and have no attenuation applied. This method would execute a little faster and consume about 10 times the memory for storage of correction matrices. Even so, a relatively small memory is required for storing correction matrices (766 table entries, 9 matrix elements per entry).

The above discussion about the threshold is applicable to cases where biased matrices are tabulated in the image analysis phase, before the image processing phase, where FIGS. 1 and 4 would additionally include a loop for handling multiple regions each having a separately calculated correction matrix. Alternately, the threshold applies to biasing the correction on-the-fly (FIGS. 2 and 5). In the latter case, at each pixel, the "first corrected color" (i.e., the one based on the "unattenuated color correction transform"—whether the transform is expressed as a matrix or something more complicated) and the distance d are computed. d is then compared against T, and if d≧T, then the calculation is finished for that pixel. The result is the color as corrected by the unattenuated transform. If d<T, the biasing and blending are done. Clearly, there are many possible variations on the details of the computation that all depend from the basic principles of the present invention.

A method has been provided for attenuating color-cast corrections to a digital image. Some examples have been given as to how the differences between the image colors and the selected highlight color can be calculated. Examples have also been given as to means of effecting the color-cast attenuation. However, there are many other algorithms, known by those skilled in the art, than can achieve results similar to the results achieved in the examples. These others variations and embodiments are also covered by the present invention.

I claim:

1. In a digital imaging device, a method for attenuating image color-cast corrections in a digital image stored in a tangible memory medium, the method comprising:

selecting a highlight color;

accepting a digital image of colored pixels;

calculating a difference between a color of at least one pixel and the highlight color;

determining an illuminant correction for the digital image;

attenuating the image illuminant correction for at least one pixel in response to the calculated color differences; and, storing an illuminate-corrected digital image in a tangible memory medium.

2. The method of claim 1 wherein selecting a highlight color includes selecting a highlight color with a plurality of color components; and, wherein calculating the difference between the color of at least one pixel and the highlight color includes calculating the difference of at least one color component of the pixel from the corresponding component in the highlight color.

3. The method of claim 2 wherein selecting a highlight color includes representing the highlight color as N color components corresponding to a point $C_h$ in an N-dimensional space, where N>1, as follows:

highlight color=$(C_{1h}, C_{2h}, \ldots C_{Nh})=C_h$.

4. The method of claim 3 wherein accepting a digital image of colored pixels includes accepting an image including a plurality of pixels, where each pixel x is represented as N color components corresponding to a point $C_x$ in an N-dimensional space, where N>1, as follows:

color at image pixel $x=(C_{1x}, C_{2x}, \ldots C_{Nx})=C_x$.

5. The method of claim 4 wherein calculating the difference between the color of at least one pixel and the highlight color includes representing the difference as a scalar difference $\Delta C_x$ between the points $C_x$ and $C_h$ in N-dimensional space as follows:

$$\Delta C_p = d[C_x, C_h]$$
$$= d[(C_{1x}, C_{2x}, \ldots C_{Nx}), (C_{1h}, C_{2h}, \ldots C_{Nh})]$$

where d is a distance metric.

6. The method of claim 5 wherein the distance metric (d) is selected from the group of distance metrics including Euclidean, $L_p$, and $L_\infty$ metrics.

7. The method of claim 6 wherein the $L_p$ distance metric is used and the p in the $L_p$ metric is dependent upon the color components of pixels in the image.

8. The method of claim 6 wherein attenuating the image illuminant correction for at least one pixel in response to the calculated color differences includes representing an illuminant correction attenuation ($A_x$) at pixel x as a function (f) of the distance $\Delta C_x$, as follows:

$A_x=f(\Delta C_x)$.

9. The method of claim 8 wherein representing the illuminant correction attenuation ($A_x$) as a function (f) of the distance $\Delta C_x$ includes selecting the function in response to an image pixel color component.

10. The method of claim 9 further comprising:
establishing a threshold T; and,
wherein representing the illuminant correction attenuation ($A_x$) as a function (f) of the distance $\Delta C_x$ includes selecting the function f=0 in response to the distance $\Delta C_x$ exceeding the value T.

11. The method of claim 10 wherein representing the illuminant correction attenuation ($A_x$) as a function (f) of the distance $\Delta C_x$ includes:
f being montonically non-increasing in the interval $0 \leq \Delta C_x \leq T$;

$f(0) = A_{max}$;

$f(T) = 0$; and, $A_{max} > 0$.

12. The method of claim 11 wherein attenuating the image illuminant correction for at least one pixel in response to the calculated color differences includes biasing the correction in response to the value of $A_x$.

13. The method of claim 12 wherein calculating a color difference includes determining a corrected color $C'_x$ by generating a global correction matrix $\underline{M_G}$ for all image pixels;
the method further comprising:
computing a set of biased correction matrices $\underline{M_k}$ cross-referenced to values of $\Delta C_x$ in the range of:

$0 \leq \Delta C_x \leq T$;

storing the set of biased correction matrices; and,
wherein attenuating the image illuminant includes computing a final corrected color $K_x$ includes:
calculating $\Delta C_x$;
comparing $\Delta C_x$ to T;
if $\Delta C_x \leq T$, retrieving a biased correction matrix from the set of stored biased correction matrices; and,
applying the retrieved biased correction matrix to the pixel color $C_x$.

14. The method of claim 13 wherein computing a final corrected color $K_x$ includes, if $\Delta C_x > T$, not attenuating the illuminant correction.

15. The method of claim 9 wherein determining an illuminant correction for the digital image includes determining a plurality of illuminant corrections; and,
wherein attenuating the image illuminant correction for at least one pixel includes attenuating a plurality of illuminant corrections that are applied to the image.

16. The method of claim 15 wherein determining an illuminant correction includes determining a first corrected color $C'_x$ for a pixel; and,
wherein attenuating the image illuminant correction for at least one pixel in response to the calculated color differences includes biasing the correction to compute a final corrected color $K_x$ for a pixel as follows:

$K_x = [A_x C_x + (A_{max} - A_x) C'_x] / A_{max}$.

17. The method of claim 16 wherein determining a first corrected color $C'_x$ for a pixel, for each illuminant correction, includes generating and applying a matrix transformation $\underline{M}$ as follows:

$C'_x = \underline{M} C_x$;

where $\underline{M}$ is a first correction matrix; and,
wherein biasing the attenuation in response to the value of $A_x$ includes computing a biased correction matrix $\underline{M_k}$ as a convex combination of an N×N identity matrix $\underline{I_n}$ and the first correction matrix $\underline{M}$, as follows:

$\underline{M_k} = [A_x \underline{I_n} + (A_{max} - A_x) \underline{M}] / A_{max}$; and, computing the final corrected color $K_x$ as follows:

$K_x = \underline{M_k} C_x$.

18. The method of claim 15 further comprising:
establishing a threshold T; and,
wherein representing the illuminant correction attenuation ($A_x$) as a function (f) of the distance $\Delta C_x$ includes selecting the function f=0 in response to the distance $\Delta C_x$ exceeding the value T.

19. In a digital imaging device, a method for attenuating image color-cast corrections in a digital image stored in a tangible memory medium, the method comprising:
selecting a highlight color with N color components corresponding to a point $C_h$ in an N-dimensional space, where N>1, as follows:

highlight color=$(C_{1h}, C_{2h}, \ldots C_{Nh}) = C_h$;

accepting a digital image of N color components corresponding to a points $C_x$ in an N-dimensional space, where N>1, as follows:

color at image pixel $x = (C_{1x}, C_{2x}, \ldots C_{Nx}) = C_x$;

for at least one color component, calculating differences between the image pixels and the highlight color, representing the difference as a scalar difference $\Delta C_x$ between the points $C_x$ and $C_h$ in N-dimensional space as follows:

$$\Delta C_x = d[C_x, C_h]$$
$$= d[(C_{1x}, C_{2x}, \ldots C_{Nx}), (C_{1h}, C_{2h}, \ldots C_{Nh})]$$

where d is a distance metric selected from the group of distance metrics including Euclidean, $L_p$, and $L_\infty$ metrics;
determining an illuminant correction for the digital image;
attenuating the image illuminant correction for at least one pixel in response to the calculated color differences; and,
storing an illuminate-corrected digital image in a tangible memory medium.

20. The method of claim 19 wherein attenuating the image illuminant correction for at least one pixel in response to the calculated color differences includes representing an illuminant correction attenuation ($A_x$) at pixel x as a function (f) of the distance $\Delta C_x$, as follows:

$A_x = f(\Delta C_x)$.

21. The method of claim 20 further comprising:
establishing a threshold T; and,
wherein representing the illuminant correction attenuation ($A_x$) as a function (f) of the distance $\Delta C_x$ includes selecting the function f=0 in response to the distance $\Delta C_x$ exceeding the value T.

22. In a digital imaging device, a method for attenuating image color-cast corrections in a digital image stored in a tangible memory medium, the method comprising:
selecting a plurality of highlight colors;
accepting a digital image of colored pixels;
calculating a difference between a color of at least one pixel and at least one highlight color;

determining an illuminant correction for the digital image;
attenuating the image illuminant correction for at least one pixel in response to the calculated color differences; and
storing an illuminate-corrected digital image in a tangible memory medium.

23. The method of claim 22 wherein selecting a plurality of highlight colors includes the selected highlight colors differing by at least one color component.

* * * * *

UNITED STATES PATENT AND TRADEMARK OFFICE
CERTIFICATE OF CORRECTION

| | | |
|---|---|---|
| PATENT NO. | : 7,421,118 B2 | Page 1 of 1 |
| APPLICATION NO. | : 10/390323 | |
| DATED | : September 2, 2008 | |
| INVENTOR(S) | : John Dalrymple | |

It is certified that error appears in the above-identified patent and that said Letters Patent is hereby corrected as shown below:

Col. 9, Line 62-67 and Col. 10, Line 1-9 Claim 17 should appear as follows:

17. The method of claim 16 wherein determining a first corrected color C'x for a pixel, for each illuminant correction, includes generating and applying a matrix transformation $\underline{M}$ as follows:

C'x = $\underline{M}$ Cx;
where $\underline{M}$ is a first correction matrix; and,
wherein biasing the attenuation in response to the value of Ax includes computing a biased correction matrix $\underline{Mk}$ as a convex combination of an N x N identity matrix $\underline{In}$ and the first correction matrix $\underline{M}$, as follows:

$\underline{Mk}$ = [Ax $\underline{In}$ + (Amax – Ax) $\underline{M}$] / Amax; and,
computing the final corrected color Kx as follows:

Kx = $\underline{Mk}$ Cx.

Signed and Sealed this

Twenty-eighth Day of October, 2008

JON W. DUDAS
*Director of the United States Patent and Trademark Office*